United States Patent [19]

Price et al.

[11] 4,200,485
[45] Apr. 29, 1980

[54] METHOD FOR MAKING HIGH PURITY, DEVITRIFICATION RESISTANT, AMORPHOUS SILICA FIBERS

[75] Inventors: George B. Price, Bowling Green, Ohio; William H. Kielmeyer, Englewood, Colo.

[73] Assignee: Johns-Manville Corporation, Denver, Colo.

[21] Appl. No.: 938,156

[22] Filed: Aug. 30, 1978

[51] Int. Cl.² .............. B44C 1/22; C03C 15/00; C03C 25/06; C01B 33/12
[52] U.S. Cl. .................. 423/335; 65/31; 156/345; 156/642; 423/340; 423/658.5
[58] Field of Search ......... 156/663, 345, 642; 65/30 R, 31, 2, 9, 11 R, 12; 23/272.5, 272.6, 271; 423/335

[56] References Cited

U.S. PATENT DOCUMENTS

| | | | |
|---|---|---|---|
| 2,718,461 | 9/1955 | Parker et al. | 156/663 X |
| 2,730,475 | 1/1956 | Parker | 156/663 X |
| 3,012,930 | 12/1961 | Labino | 156/663 X |

*Primary Examiner*—William A. Powell
*Attorney, Agent, or Firm*—Robert M. Krone; Joseph J. Kelly; William C. Anderson

[57] ABSTRACT

This invention involves a method of making high purity amorphous silica fibers having excellent resistance to devitrification by double leaching sodium silicate type fibers.

8 Claims, 5 Drawing Figures

METHOD FOR MAKING HIGH PURITY, DEVITRIFICATION RESISTANT, AMORPHOUS SILICA FIBERS

This invention is related to the inventions disclosed in U.S. patent applications Ser. Nos. 391,394, filed Aug. 24, 1973, 391,395, filed Aug. 24, 1973 and 555,777, filed Mar. 6, 1975, all of which are now abandoned.

TECHNICAL FIELD

This invention relates to a method for making high purity amorphous silica fibers having excellent resistance to devitrification for use in high temperature environments.

BACKGROUND OF THE INVENTION

Following the approval of the space shuttle space program a need arose for amorphous silica fiber having excellent resistance to devitrification at temperatures up to 2500° F. and for exposure times at this temperature of up to 4 hours. It has long been recognized that fibers of substantially pure silica can be produced by forming fibers from a glass such as type E glass having softening and melting characteristics suitable for convenient fiber formation followed by leaching to remove substantially all of the nonsilica components from the fibers by immersing the E glass fibers in an aqueous solution of sufficient acidity to extract the acid soluble components. Improved fibers of this general type are disclosed in U.S. Pat. No. 3,687,850, but these fibers will not meet the above described stringent devitrification resistance requirements because of the relatively high alumina contents of 4 to 8% and the relatively high contents of other nonsilica materials such as calcium oxide, barium oxide, magnesium oxide, and boron oxide.

It has also been known to make silica fibers from glass compositions containing mostly soda and silica, for example, see U.S. Pat. Nos. 3,092,531 and 3,560,777. The fibers described in the latter patent were useful to temperatures of only about 2200° F. because of a relatively high impurity level. Attempts to make amorphous silica fibers having excellent resistance to devitrification at temperatures as high as 2500° F. according to the process disclosed in U.S. Pat. No. 3,092,531, but modified for treatment of loose fiber instead of fibrous mats, resulted in fibers having a high degree of nonuniformity and thus a very low percentage, e.g., 15 to 20% acceptance level based on devitrification resistance at 2500° F. for 4 hours.

Several techniques of leaching were developed in an attempt to make the desired silica fibers. In one technique sodium silicate glass fibers made using ordinary glass sand were placed into an open tank. An acid solution was then added to the tank and the tank was heated with burners directly beneath the tank to bring the solution up to the proper temperature for leaching. Once the acid solution was brought up to the desired temperature, it was maintained at this temperature until the leaching process was completed with the batch in the tank being stirred occasionally to break up the fiber clumps and redistribute the fibers within the tank. After the desired silica content was obtained, the acid solution was drained from the tank and a rinsing operation was commenced. Once the fibers had been rinsed to the necessary degree, they were removed from the tank and pressed into cakes. This pressing operation eliminated about 80% of the water from the fibers. The cakes were then placed in an oven and dried. Afterwards, the outside surfaces of the cakes were trimmed off and the cakes were broken up to form fiber clumps for shipment. Fiber made according to this process proved to be very nonuniform in impurity level and in devitrification resistance and was unacceptable for the intended use.

In an attempt to improve uniformity a process described in U.S. patent application Ser. No. 391,394, filed Aug. 24, 1975 and now abandoned, was developed (hereinafter "perking process"). In this process the fiber was put into a perforated basket residing in the upper half of a leach tank. Hot acid was recirculated in the tank, passing down through the fiber and rising up through an inverted funnel whose stem extended into the middle of the basket area. This method was unsuccessful for several reasons. First, the perking action (acid recirculation) did not begin until the temperature of the acid solution reached 140° F. Up to this time, sodium was being extracted from the fiber, but remained in the immediate vicinity of the fiber. If the slurry was not periodically moved, enough sodium salt could accumulate to recombine with the fiber and form a cementitious mass of bonded filaments. These conglomerates were often too large to leach thoroughly. Second, stirring could alleviate the consolidation problem, but was difficult to do well by hand because of the stiffness of the fiber and costly to do by machine because of the interference of the center stem. Third, once the unit began to perk, lids were required for the tank to protect the tank operator. Stirring was needed during perking because, although a perforated lid was set on top of the basket to distribute the acid uniformity over the fiber, channeling inevitability occurred as the acid filtered down through the fiber, causing some pockets of fiber to go incompletely treated. The installation of lids prevented even hand-stirring unless the entire unit was shut down. Finally, the perk tank could not be operated in a controllable or reproducable manner.

In an attempt to avoid the problems associated with the perking process, a process disclosed in U.S. patent application Ser. No. 391,395, filed Aug. 24, 1973 and now abandoned (hereinafter '395) was developed. In this process loose sodium silicate fibers, made using ordinary glass sand, were placed in a perforated basket resting in the upper half of a leaching tank. The acid solution was added to the tank until the fibers in the perforated basket were barely covered. Burners below the tank were ignited to heat the acid solution to the desired temperature and immediately circulation of the acid solution from the bottom of the tank back to the top of the perforated basket was begun. This was accomplished using a pump and line external of the leaching tank. The acid solution was added back to the basket of fibers using either a rotating spray manifold or by dumping the acid solution onto the top of a perforated lid allowing the acid solution to drain down through holes in the lid into the fibrous mass. As soon as the acid solution reached the desired temperature the burners were used only to maintain the desired temperature during the leaching period. Following the leaching period the fibers were rinsed and processed in the same manner as described above. While the '395 process eliminated most of the problems inherent in the perking process, the resultant fibers showed a high degree of nonuniformity and only about 15-20% of the lots of fibers made according to this technique displayed the necessary devitrification resistance at 2500° F. that was required.

It was also discovered that when the average level of alumina in the leached fibers dropped below about 0.16%, by weight, the fiber displayed good devitrification resistance, but when the alumina content was above about 0.20%, substantial devitrification nearly always occurred in a 2500° F. test. It was also determined that the alumina content in the leached fibers of the prior art varied considerably from levels below 0.16% to levels well above 0.2% within the same batch.

Since the alumina impurity was being introduced into these fibers by the use of industrial grade glass sand in the fiber manufacturing process, it was decided that the problem could be solved by using pure silica in place of the glass sand. Fibers were made using CAB-O-SIL, a high purity silica product of the Geofrey L. Cabot, Inc., and leached according to the process of '395. While having a very low alumina content of below about 0.025%, by weight, and displaying satisfactory devitrification resistance, the very fine particle size of the CAB-O-SIL, and other high purity silica materials, would require pretreatment, e.g., pelletizing, prior to melting for the production of the glass fibers to prevent excessive dust problems and losses. Also, the relatively high cost of these pure silica materials compared with ordinary glass sand would be a significant disadvantage in the manufacture of silica fibers.

It has also been discovered, as evidenced by U.S. patent application Ser. No. 555,777, filed Mar. 6, 1975 and now abandoned (hereinafter '777), that if the silica raw material used to make the precursor sodium silicate fibers is properly selected based on the level of nonsilica impurities it contains, and if the fibrous mass is periodically gently stirred and fluffed up during the recirculating acid solution leaching and the rinsing cycles silica fibers can be produced having excellent resistance to devitrification and relatively low shrinkage and distortion up to 2500° F. Using the process of the '777 invention, relatively low cost silica raw materials can be used to produce a silica fiber having alumina contents above about 0.025% and below about 0.2%. The titanium dioxide content, which is thought to be significant to devitrification resistance, is preferably lower than about 0.02% and preferably below about 0.01% in the final silica fiber.

The apparatus of '777 differed from the apparatus described in '395 by utilizing a mechanical stirrer or agitator in addition to or in combination with the means used to distribute the acid solution to the top surface of the fibrous mass in the perforated basket.

BRIEF SUMMARY OF THE INVENTION

It has also been found highly desirable to have silica fibers which uniformly and consistently have a sodium oxide and potassium oxide content of less than 0.01 weight percent because these two compounds, albeit potassium oxide to a lesser extent, have been thought to be significant factors in making silica fibers more resistant to devitrification. The greater the concentration of these compounds in the silica fibers, the less the fibers are resistant to devitrification. While the process of '777 uniformly and consistently produced silica fibers having a sodium and potassium oxide content of 0.02 weight percent maximum, it has been incapable of producing silica fibers uniformly and consistently having a sodium and potassium oxide content of less than 0.01 weight percent.

The method of the present invention achieves the highly desirable result of producing silica fibers uniformly and consistently having a sodium oxide and potassium oxide content of less than 0.01 weight percent by leaching the silica fibers in two steps or cycles, using an equal amount of leaching acid solution during each cycle for an equivalent amount of time. At the end of the first leaching cycle, the silica fibers are given an initial rinse with deionized water and then immediately subjected to a second leaching cycle. In addition to producing the highly desirable result mentioned above, silica fibers made according to the instant process are as uniform in properties as the process described in '777, as evidenced by an acceptance level in excess of 90% of the lots or batches of fiber produced based upon a devitrification resistance for 4 hours at 2500° F. of less than 5 weight percent crystallinity, preferably less than 2 weight percent, and most preferably less than 1 weight percent, as determined by X-ray diffraction in comparison with a 100% cristobalite control sample.

Thus, the method of the present invention differs from that described in '777 by employing a double leaching step in which the total amount of acid that is used in '777 is broken up into two equal parts and utilized in the leaching steps.

DETAILED DESCRIPTION AND PREFERRED EMBODIMENTS

Precursor sodium silicate glass fibers for use in the present invention are made using conventional glass fiberizing techniques, such as the well known flame attenuation process. The resultant fluffy fibrous mass, which does not contain binder, is collected on a moving permeable belt and should have the properties set forth in Table I.

TABLE I

|  |  | Suitable Range | Preferred | Most Preferred |
|---|---|---|---|---|
| Average Fiber Diameter (Microns) | | 0.2–5 | 1–2 | 1.4–1.7 |
| Chemical Analysis % by Wt. Basis) | | | | |
| | SiO$_2$ | 72.6–76 | 74.35–74.65 | 74.4–74.6 |
| | Na$_2$O | 23 Min. | 23.5 Min. | 24.2 Min. |
| | Al$_2$O$_3$ | 0.16–.02 | 0.11–.025 | 0.07–.03 |
| | TiO$_2$ | 0.01 Max. | 0.008 Max. | .005 Max. |
| K$_2$O | | 0.06 Max. | 0.06 Max. | 0.06 Max. |
| | MgO | 0.01 Max. | 0.01 Max. | 0.008 Max. |
| | CaO | 0.03 Max. | 0.026 Max. | 0.02 Max. |
| | Fe$_2$O$_3$ | 0.03 Max. | 0.028 Max. | 0.025 Max. |
| Sum of Other | R$_2$O$_3$ | 0.01 Max. | 0.01 Max. | 0.01 Max. |
| Sum of Other | RO | 0.01 Max. | 0.01 Max. | 0.01 Max. |

TABLE I-continued

| | Suitable Range | Preferred | Most Preferred |
|---|---|---|---|
| Sum of Other RO$_2$ | 0.01 Max. | 0.01 Max. | 0.01 Max. |

The mat-like fibrous mass is removed from the perforated collection belt in the form of clusters or sheets having frayed edges and are leached in apparatus shown in FIGS. 1-5.

Figure 1:
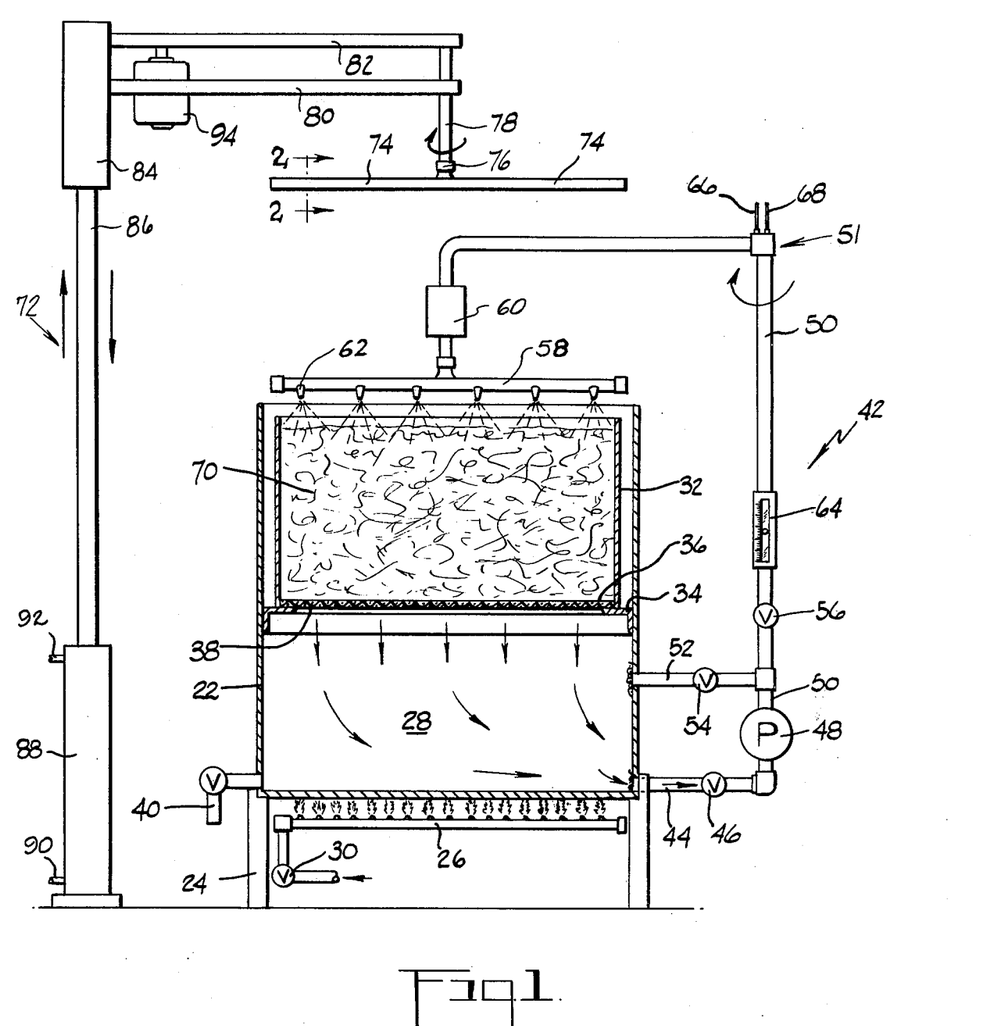
FIG. 1 is an elevational view of a digestor comprising a leaching tank, acid solution recirculation system, and removable stirrer with the leaching tank shown in cross-section.
Figure 2:
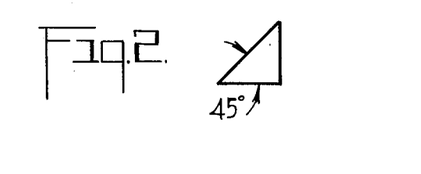
FIG. 2 is a cross-section of the stirring blade shown in FIG. 1 as viewed along lines 2—2.

Referring to FIG. 1, the leaching apparatus includes a cylindrical tank 22 which is made of stainless steel or MONEL, available from the International Nickel Co., or other acid resistant material, and is mounted on a support frame 24 above a bank of burners 26 which heat the leaching solution 28 within the tank 22. Where the tank is made from a material not suited to heating in this manner, such as plastic or reinforced plastic, a conventional submersion heater (not shown) can be used in place of the burners. A conventional control valve 30 is provided to regulate the burners 26 to control the temperature of the leaching solution 28 within the tank.

A removable stainless steel of MONEL basket 32 having a permeable bottom wall 36, such as a perforated plate, screen, etc., is disposed in the tank 22. The basket 32 is cylindrical in shape and is supported by an annular ledge 34 which engages a bottom wall 36 of the basket. The bottom wall 36 of the basket is preferably a perforated plate provided with a plurality of round apertures 38 having diameters about ⅛ to ¼ inch distributed throughout the bottom wall to permit the passage of leaching solution therethrough while retaining the fibrous mass in the basket. The basket 32 is preferably dip coated in polyethylene for further protection from corrosion.

The tank 22 is provided with a drain 40 for draining leaching solution and rinse water from the tank. The bottom portion of the tank need not be flat. The tank is also provided with a circulating system 42 for circulating and recirculating the leaching solution through the fibrous mass during the leaching cycle and including the initial start-up of the process while the leaching solution is being brought up to the desired temperature. The circulating system 42 includes a stainless steel outlet line 44 provided with an on-off valve 46. The outlet line 44 is connected to an impellor type or tube type pump 48 which pumps the fluid into a discharge line 50 for discharge into the top of the tank above the basket 32. A by-pass line 52 with a regulatory or on-off valve 54 is provided to direct fluid back into the tank 22 at a point below the basket 32 if desired. A discharge line 50 is also provided with a regulatory valve 56 to regulate the amount of leaching solution discharged into the top of the basket. By adjusting the regulatory valve 56 and the valve 54 in the by-pass line 52, the flow rate of the leaching solution through the basket 32 can be easily regulated.

As shown in FIG. 1, the discharge line 50 is connected to a rotating spray arm 58. The spray arm 58 is rotated by a conventional motor 60, which can be driven by the flow of leaching solution passing therethrough, and the arm is provided with a plurality of nozzles 62 or apertures which spray the leaching solution onto the upper surface of the fibrous mass within the basket to distribute the solution over the fibers, to stir the fibers, to prevent compaction of the fibers, and to force the fibers down into the leaching solution. While the apparatus is shown with only one spray arm, a plurality of rotating or preferably fixed spray arms can be utilized so long as they provide a uniform application of leaching solution over the entire top surface of the fibrous mass in the basket 32.

Figure 5:
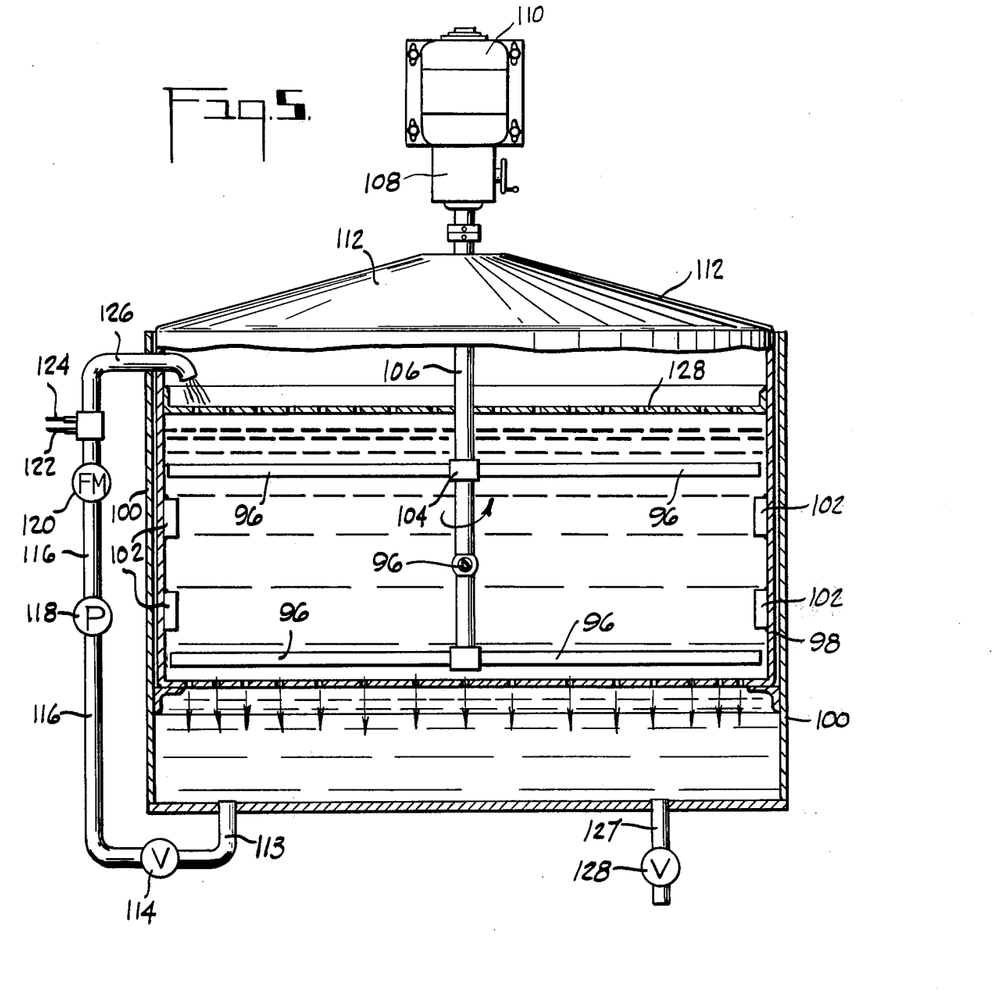
FIG. 5 is another and more preferred version of the apparatus of the type disclosed in FIGS. 1 and 3.

As an alternative to one or more spray arms, the basket 32 can be provided with a cover which fits over the upper end of the basket, e.g., see element 128 in FIG. 5. This cover is provided with a plurality of apertures distributed throughout the cover to effect distribution of the leaching solution over the entire upper surface of the fibrous mass in the basket 32. With this arrangement, the discharge line 50 would discharge leaching solution directly onto the upper surface of the cover.

With either one or more spray arms, or the perforated cover, the discharge line 50 is provided with a conventional flow meter 64 to determine the rate of flow of the leaching solution through the basket. The discharge line is also provided with a conventional thermometer 66 and a pH probe 68 to monitor the temperature of the solution being discharged into the basket and the pH of the solution so that the leaching solution can be maintained at the desired temperature and pH value for the particular leaching operation. For safety purposes, removable cover (not shown) can be placed over the top of tank 22 to prevent any over spray of the leaching solution.

The rotating spray arm 58 and drive 60 can be rotated away from the top of the tank 32 by rotation of a rotating connector 51 about pipe 50. This is done to allow access for a stirring mechanism 72 to the fibrous mass.

The stirring mechanism 72 includes two stirring blades 74 made of an acid resistant material like stainless steel. These stirring blades preferably have a cross-section of the shape shown in FIG. 2, but other conventionally shaped stirring blades could be used. The stirring blades 74 fit into a blade holder 76 which in turn is attached to a rotatable shaft 78. The shaft 78 passes through conventional bearings (not shown) mounted on a pair of support arms 80 and 82. The support arms 80 and 82 are mounted to a vertical support member 84 which is in turn mounted on a rod 86 of a cylinder 88 that is mounted to the floor adjacent the leaching tank. The rod 86 can be raised or lowered by pumping fluid to and away from the cylinder 88 at points 90 and 92 in a well known manner. Thus rod 86 can be made to move up and down in the direction shown by the arrows in FIG. 1 to raise and lower the stirring blades 74 out of or into the fibrous mass 70 in the basket 32.

Shaft 70 is caused to rotate by starting a motor 94 mounted on support arm 80 which is connected to a sprocket or pulley (not shown) on shaft 78 in the vicinity of support arm 82 by any suitable drive means, such as a chain or belt (not shown).

In the operation of the apparatus as shown in FIG. 1 according to the method of the present invention the basket 32 and the tank 22 are prepared for the first leaching cycle by a rinsing with deionized water having an electrical resistivity of at least 200,000 ohm-cm. The tank 22 is then filled with deionized water to within 6 to 10 inches from the bottom of the basket 32. The valves 46 and 56 are opened and the pump 48 is started. Next, a sufficient amount of reagent grade sulfuric acid or hydrochloric acid is added to the tank 22 to produce the desired acid solution concentration. Hydrochloric acid is preferred and an acid solution concentration of about 9¾ gallons of reagent grade HCl to 800 gallons of water and 120 lbs. of fiber uses about one-half the total amount of acid used in the double leaching process of the present invention. This produces a pH of about 0.5. The acid solution is circulated through the pump 48 and the rotating spray arm 58 for about 5 minutes to insure proper mixing. The circulating flow through the flow meters 64 is adjusted by valve 56 to provide an acid solution flow rate of between 10 and 20 gallons per minute. The pump 48 is then stopped and the rotating spray arm 58 and drive 60 are rotated away from the top of the tank 22 by rotation of member 51 about pipe 50.

The stirring blades 74 are then lowered into the basket 32 by manipulation of the cylinder 88 until the bottom of the blades 74 are about ½ inch above the surface of the acid solution in the basket 32. The stirrer blade drive 94 is started, usually as the blades are being lowered, which causes rotation of the shaft 78. The output speed of the drive 94 is adjusted to produce a gentle blade rotation of less than 20 rpm and preferably less than about 17 rpm to prevent breaking any subsequently added fibers by too rapid a movement of the stirring blades. Next, fibers preferably in the form of sheets between about 4 and 30 inches square, preferably between about 12 and 18 inches square, and ¼ to ½ inch thick are added to the basket 32, preferably without contacting the stirrer blades until the fibers are in the acid solution. As the fibers are added the acid solution level is raised gradually by introducing deionized water between the basket 32 and the tank 22. The baldes 74 are maintained slightly above the acid surface by manipulation of the cylinder 88. After all of the fiber for a particular batch has been added to the basket 32 the acid solution level is raised to within about 6 to 8 inches below the top rim of the basket 32 by addition of deionized water. In the embodiment of FIG. 5, this last step is superfluous because the necessary acid solution level is reached at the time the 800 gallons of water is originally added to the tank 100.

Next, the stirrer blades are slowly lowered, while rotating, through the fibrous mass and held for a short time, e.g., about one minute, on the bottom of the basket. The rotating blades 74 are then gradually raised through the fibrous mass to gently fluff up the fibrous mass to prevent channeling and to allow acid solution to contact all of the fibers. The blades 74 are raised at a rate that will take about ½ to 10 minutes, preferably about 3 minutes, for the blades to clear the top of the fibrous mass.

The stirrer blades 74 are then raised to the position shown in FIG. 1 and the blade drive 94 is shut down. The spray arm 58 is then swung back over the basket 32 and the valve 56 is opened sufficiently to provide an acid solution flow rate through the flow meter 64 and the rotating spray arm 58 of about 30-50 gallons per minute. The acid solution is sprayed onto the top of the fibrous mass from the nozzle 62, flows through the fluffed up fibrous mass from the nozzle 62, flows through the fluffed up fibrous mass 70, and into the acid solution reservoir 28 in the bottom of tank 22 in the manner shown by the arrows, and on into pipe 44 for recirculation by pump 48. The burners 26 are then lit and adjusted by valve 30 to raise the temperature of the acid solution as determined by the thermometer 66 to a temperature in the range of about 180° to 250° F., preferably 180°-190° F., within a suitable period of time, e.g., in less than 8 hours, and preferably within about 4 to 8 hours.

Every hour while the acid solution is heating, and after it has reached the prescribed soaking temperature, the fibrous mass 70 is gently fluffed up by the rotating stirring arms 74 in the same manner as described above. When the fiber is relatively stiff and tends to float near the surface of the acid solution, the stirring blades 74 are lowered while rotating through the fibrous mass until they reach the bottom of the basket. They are left rotating there for one minute and then raised very slowly, e.g., over a three minute period, up through the fibrous mass 70 and out of the top of the basket 32. Later in a leaching cycle when the fiber becomes well broken up and tends to lay near the bottom of the basket, the stirring blades 74 are raised and lowered at least 5 times over a three minute period through the fibrous mass 70, allowing the blades to rest on the bottom for about 30 seconds during one of the raising and lowering cycles.

During a leaching cycle the acid solution should be maintained at a level sufficiently high to just cover the top of the fibrous mass 70. This acid solution level is maintained by adding deionized water to the tank 22 as required. After the acid solution has reached 180° F. the above described procedure is continued for 15 minutes to about 4½ hours, preferably about 2½ hours. At this point the acid solution is drained from the tank 22 and the fibrous mass 70 by opening the valve in line 40, thereby signifying the end of the first leaching cycle.

After the acid has been drained an initial rinse cycle is effectuated in which the sides of the tank and the basket containing the fibrous mass 70 are rinsed down with deionized water and drained from the tank 22. The drain valve in the line 40 is then closed and the tank 22 is filled with deionized water to a level just slightly above the fibrous mass 70. The fibrous mass 70 is gently stirred for about ½ to 10 minutes, preferably about three minutes, by raising and lowering the stirring blades 74 through the fibrous mass about 2 to 5 times, and allowing the blades to remain on the bottom of the basket for about 30 seconds during one of the cycles. The stirring blade drive 94 is then shut down and the water is drained from the tank 22 by opening the valve in the line 40. The valve is closed and the tank is refilled with deionized water. The pump is started and the rinsing water is recirculated through the fibrous mass for 30 minutes at a flow rate of about 30-50 gallons per minute. During the last portion, i.e., 10 minutes, preferably the last 3 minutes, of this 30 minute rinse, the fibers are again gently stirred as described above.

Immediately after this initial rinse of the fibers, the second leaching cycle is begun by adding the remaining half of the total amount of reagent grade HCl, i.e., about 9¾ gallons, to 650 gallons of water and the fibers of the first leaching cycle. One hundred and fifty fewer gallons of water are used in the second leaching cycle because the fibers are wet as a result of the first leaching cycle. The second leaching cycle is identical to the first leaching cycle as described supra, other than the reduction of the amount of water added to the hydrochloric acid. At the end of the second leaching cycle a rinse cycle, which is equivalent to the initial rinse cycle described earlier, is effectuated.

Following this last rinsing cycle, three rinse water samples are taken at different locations in the tank and their resistivity is measured. If all three samples have resistivities above 150,000 ohm-cm and if the difference between the highest and lowest readings is 100,000 ohm-cm or less, the fiber is sufficiently rinsed. If the rinse water fails this resistivity test the tank is drained and the last described rinsing cycle is repeated.

A periodic stirring and fluffing of the fibrous mass during the two leaching cycles and the rinsing operations produces the uniformity required in the leached fibers. Using the techniques described above, combined with a more uniform silica source, results in an improvement in the 15-20% prior art recovery rate of devitrification resistant silica fibers which have less than 0.01 maximum weight percent content of sodium oxide and potassium oxide to over 90%, e.g., 92-98%.

After rinsing the fibers, the fibrous mass is removed from the basket 32, dried, and packaged for shipment. While the fibers can be dried by pressing them into cakes or centrifuging and drying the cakes or fiber in an electric, dielectric, or gas fired oven, drying the loose fibrous mass at temperatures in the range of 500-600° F. or higher is preferred. Lower temperatures can be used but at the expense of some strength in the dried fiber. If maximum strength is important to the intended end use lower temperature drying should not be used.

While ordinary glass sand may frequently have a composition suitable for producing fibers having a composition meeting the limitations shown in Table I, the nonsilica portion of ordinary glass sands vary and will occasionally be excessive for use in the present process. Thus, careful selection based on frequent chemical analysis for nonsilica components is required to insure successful results when using ordinary glass sands. Two high silica, natural raw materials have been found to be especially useful in the present invention. Typical chemical compositions of these two naturally occurring materials are shown in Table II.

TABLE II

| Typical Chemical Analysis (wt. %) | Material A | Material B |
|---|---|---|
| SiO$_2$ | 99.6-99.9 | 99.7-99.8 |
| Al$_2$O$_3$ | .04-.08 | .05-.06 |
| Fe$_2$O$_3$ | .004-.005 | .02-.035 |
| TiO$_2$ | Trace | .007-.008 |
| CaO | .001-.007 | .01-.018 |
| MgO | .001 | .002-.004 |
| LOI | Not Determined | .08-.10 |

The two materials described in Table II have particle sizes similar to ordinary glass sand and thus can be handled and melted in the same manner as when ordinary glass sand is used for silica component in the glass fibers. The cost of the materials described in Table II are significantly less expensive than synthetic high purity silica materials. Material B above compares favorably in price with ordinary glass sand and the price of material A above is less than one tenth that of the synthetic high purity fumed silicas.

Figure 3:
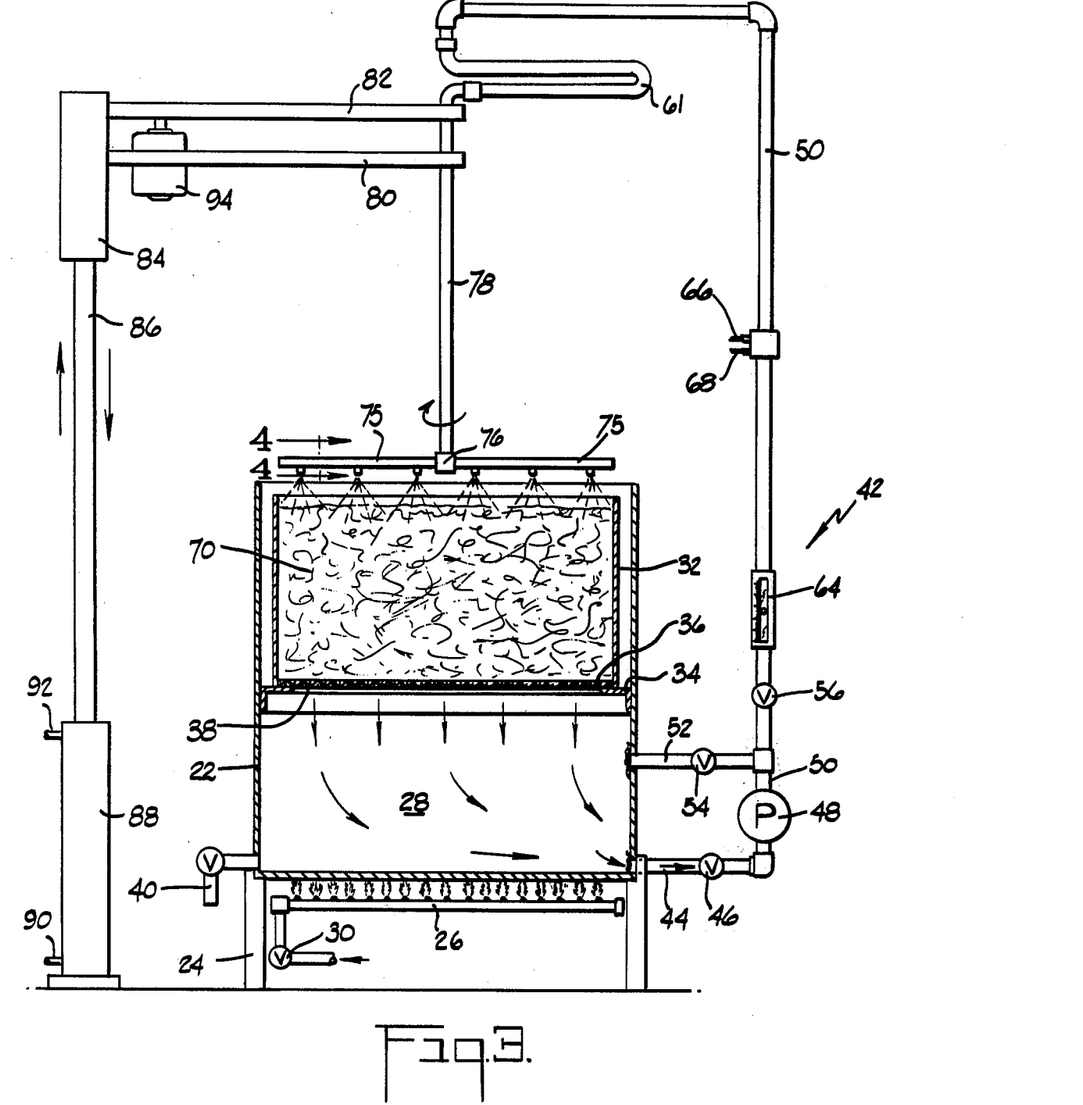
FIG. 3 is a modified version of the apparatus shown in FIG. 1 wherein the stirring blade and rotating spray manifold are combined.
Figure 4:
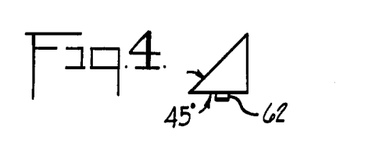
FIG. 4 is a cross-section of the combined stirring blade and spray manifold shown in FIG. 3 as viewed along lines 4—4.

FIG. 3 illustrates a modification of the apparatus shown in FIG. 1 in which the stirring blades and the spray arm have been combined to eliminate the need to move the spray arm away from the top of the tank to permit stirring. Like elements in the embodiment shown in FIG. 3 to the embodiment shown in FIG. 1 are identified by the same numerals. In this embodiment the stirring blades 75 are hollow and have a preferred cross-section as shown in FIG. 4 as viewed along lines 4-4 in FIG. 3. The bottom plates of the stirring blades 75 are fitted with nozzles 62 through which the acid solution and rinsing water are sprayed onto the fibrous mass. The acid solution is fed to the hollow stirring blades 75 via a hollow blade holder 76 and a hollow shaft 78. The acid solution return line 50 is connected to the hollow shaft 78 by a flexible acid resistant hose 61 to permit the stirring blades 75 to be moved into and out of the basket without requiring the disconnection of the acid solution recirculating system. Using the embodiment shown in FIG. 3, it is not necessary to discontinue recirculation of the acid solution during stirring. Note that in this embodiment the spray arm drive 60 used in the embodiment shown in FIG. 1 is not required since the stirring blade drive 94 also serves as a spray arm drive. By using a variable speed drive for the drive 94 different rotational speeds can be provided, if desired, for the stirring function and for the spraying function. Otherwise, the embodiment disclosed in FIG. 3 is operated in the same manner as that described for the embodiment shown in FIG. 1.

A still further embodiment of the apparatus of the present invention, and the more preferred, is illustrated in FIG. 5. In this embodiment a plurality of stirring blades 96 are located at three different levels in a perforated basket 98 setting in a tank 100. Baffles 102 are located on the interior of the basket and inclined at 45° to cause the fibrous mass striking the baffles to move upward along the outer walls of the basket. A sufficient number of the baffles 102 are placed around the inner periphery of the basket to produce a fluffing action when the stirring blades 96 are rotated. The bottom and middle sets of the stirring blades are angled to direct the fibrous mass upward whereas the top stirring blades are angled to direct the fibrous mass downward as the stirring blades are rotated. The stirring blades 96 are attached to a drive shaft 106 by blade holders 104. The drive shaft 106 is rotated by a motor 110 and a variable reducer 108. The tank 100 has fixed covers 112 to prevent over spray or splashing of the acid solution. An outlet 113, a valve 114, a return line 116, a pump 118, a flow meter 120, a thermometer 122, and a pH meter 124 are identical to their counterparts in the other embodiments. An acid resistant line 126 completes the recirculation system. A perforated plate 128 is illustrated in this embodiment for distributing the acid solution to the fibrous mass in a uniform manner, but it is to be understood that this perforated plate could be replaced by one or more rotating spray arms, or by a plurality of spray heads in a fixed position to uniformly cover the top of the fibrous mass. In the embodiment of FIG. 5, the cover 112 and the entire stirrer assembly can either be lifted out of the tank 100 and the basket 98 by conventional means (not shown), or the tank 100 and the basket 98 can be lowered away from a fixed stirring blade assembly and cover 112 by a conventional means (not shown). Drain line 127 and valve 128 allow the tank to be drained of acid solution or rinse water in the manner above described. A conventional submersion heater (not shown) may provide the necessary heat for the leaching solution or any other conventional acid resistant heat exchanger may be used.

While not shown, a most preferred variation of the embodiment of FIG. 5 comprises the use of an interconnected planar top cover, perforated acid solution distributing plate, and stirrer assembly. The planar top cover, which prevents over spray or splashing of the acid solution is supported on a flange on a tank 100 and is provided with a fiber loading funnel positioned proximate the acid resistant line 126. The distributing plate is supported upon a flange formed at the upper edge of a basket 98. The stirrer assembly comprises a plurality of crossing, oblique stirring blades conventionally attached to the lower portion of a drive shaft which is rotated by a motor and a variable reducer. The oblique stirring blades extend below the lower edge of the drive shaft and give better fiber spreading, agitation and acid mixing than the sets of blades shown in FIG. 5 due to increased turbulence behind the blades. A single stirring blade is disposed near the upper surface of the leaching solution to ensure that the fiber near the upper surface of the leaching solution is agitated. Also, the use of baffles 102 or the raising and lowering of the blades, as described with respect to FIG. 1 are obviated.

The operation of the apparatus of the embodiment of FIG. 5 is the same as the operation of the apparatus of the other embodiments except that the stirring blades 96 are merely turned on for 6 to 8 seconds for every 4 minute segment during the leaching and rinsing cycles of the fibers. This embodiment does offer the advantage that the acid solution and rinse water recirculation can continue from above the top of the fibrous mass during the entire leaching and rinsing process, including the time during which the stirring blades are in operation.

Fibers made according to the present invention typically have compositions as shown in Table III, in percent by weight:

TABLE III

| Chemical Analysis | Suitable | Preferred |
|---|---|---|
| $SiO_2$ | 99.6 min. | 99.7 min. |
| $Al_2O_3$ | 0.20 max. | 0.025-0.16 |
| $Na_2O + K_2O$ | 0.01 max. | 0.005 max. |
| $CaO + MgO$ | 0.04 max. | 0.03 max. |
| $TiO_2$ | 0.01 max. | 0.007 max. |

Most preferably the alumina content of the finished fibers is within a range of 0.03-0.11 weight percent.

STATEMENT OF INDUSTRIAL APPLICATION

As implied above, the method of the present invention is applicable to those areas which require the use of an amorphous silica fiber having excellent resistance to devitrification at temperatures up to 2500° F. and for exposure times at this temperature up to 4 hours.

In describing the invention certain embodiments have been used to illustrate the invention and the practice thereof. However, the invention is not limited to those specific embodiments as other embodiments and modifications within the spirit of the invention will readily occur to those skilled in the art on reading of this specification. The invention is thus not intended to be limited to the specific embodiments disclosed, but instead is to be limited only by the claims appended hereto.

What is claimed is:

1. A double leaching process for making amorphous silica fibers having excellent resistance to devitrification at temperatures up to 2500° F. comprising:
    providing a mass of glass fibers having a composition, on a weight basis, of about 72.6-75% silica, at least about 23.5% soda, about 0.02-0.16% alumina, and less than about 0.01% titanium dioxide, into a digestor,
    leaching the fibers in a first leaching cycle comprising:
    forming in said digestor a slurry comprising said fibrous mass and a leaching solution, said fibrous mass being covered with said leaching solution,
    heating said slurry to a temperature within the range of about 180°-205° F. and during said heating withdrawing leaching solution from the digestor at a point below said fibrous mass and reintroducing the leaching solution to the top surface of the fibrous mass, and periodically gently stirring said slurry to prevent settling of the fibers and channeling and to fluff the fibers up into a loose mass to facilitate uniform flow of the leaching solution through the entire mass,
    draining the leaching solution from the digestor,
    rinsing the fibrous mass in an initial rinsing cycle in order to remove residue leaching solution and soluble salts and during said rinsing periodically gently stirring said fibrous mass to prevent channeling and settling of the fibers and to fluff up the fibrous mass to facilitate uniform flow of the rinsing solution through the fibrous mass,
    leaching said fiber in a second leaching cycle comprising:
    again forming in said digestor a slurry comprising said fibrous mass and a leaching solution, said fibrous mass again being covered with said leaching solution,
    again heating said slurry to a temperature within the range of about 180°-205° F. and during said heating withdrawing leaching solution from the digestor at a point below said fibrous mass and reintroducing the leaching solution to the top surface of the fibrous mass, and periodically gently stirring said slurry to prevent settling of the fibers and channeling and to fluff the fibers up into a loose mass to facilitate uniform flow of the leaching solution through the entire mass,
    again draining the leaching solution from the digestor when the batch of fibers is leached to the desired extent,
    again rinsing the fibrous mass in a final rinsing cycle to remove residue leaching solution and soluble salts and during said rinsing periodically gently stirring said fibrous mass to prevent channeling and settling of the fibers and to fluff up the fibrous mass to facilitate uniform flow of the rinsing solution through the fibrous mass, and drying the fibrous mass.

2. A process as defined in claim 1 wherein the original glass fibers have an alumina content within the range of about 0.02-0.11 weight percent.

3. A process as defined in claim 2 wherein the alumina content is within the range of about 0.03-0.07 weight percent.

4. A process as defined in claim 3 wherein the titanium dioxide content of the original glass fibers is no more than 0.005 weight percent.

5. A process as defined in claim 1 wherein the fibrous mass is stirred for about 6 to 8 seconds for every 4 minute segment of the leaching and rinsing cycles.

6. A process as defined in claim 1 in which the leaching solution of said first leaching cycle is formed by adding 9¾ gallons of reagent grade HCl to 800 gallons of water.

7. A process as defined in claim 1 or 6, in which the leaching solution of said second leaching cycle is formed by adding 9¾ gallons of reagent HCl to 650 gallons of water.

8. The product obtained from the process of claim 1.

* * * * *

UNITED STATES PATENT AND TRADEMARK OFFICE
CERTIFICATE OF CORRECTION

PATENT NO. : 4,200,485
DATED : April 29, 1980
INVENTOR(S) : George B. Price
William H. Kielmeyer It is certified that error appears in the above—identified patent and that said Letters Patent is hereby corrected as shown below:

Table 1, line "$K_2O$  0.06 Max  0.06 Max  0.06 Max  0.06 Max" should be moved 1 column to the right in order to fall under proper columnar heading. (Each column should be moved.)

Column 5, line 23, "of" should be --or--.

Column 11, line 46, "those" should be --these--.

Column 12, line 62, "claim" should be --claims--.

Signed and Sealed this

Seventh Day of October 1980

[SEAL]

Attest:

SIDNEY A. DIAMOND

Attesting Officer

Commissioner of Patents and Trademarks